United States Patent Office 3,216,392
Patented Nov. 9, 1965

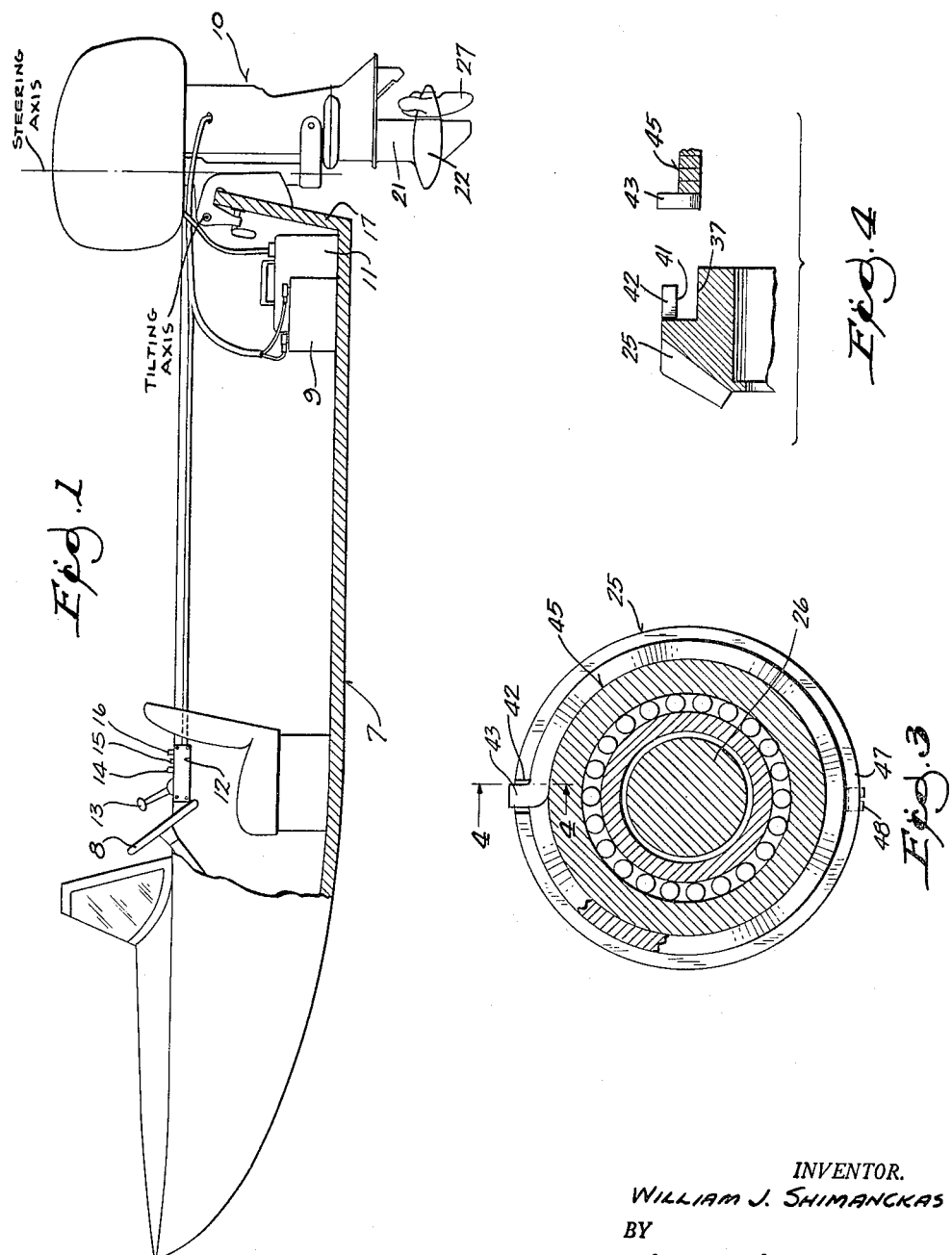

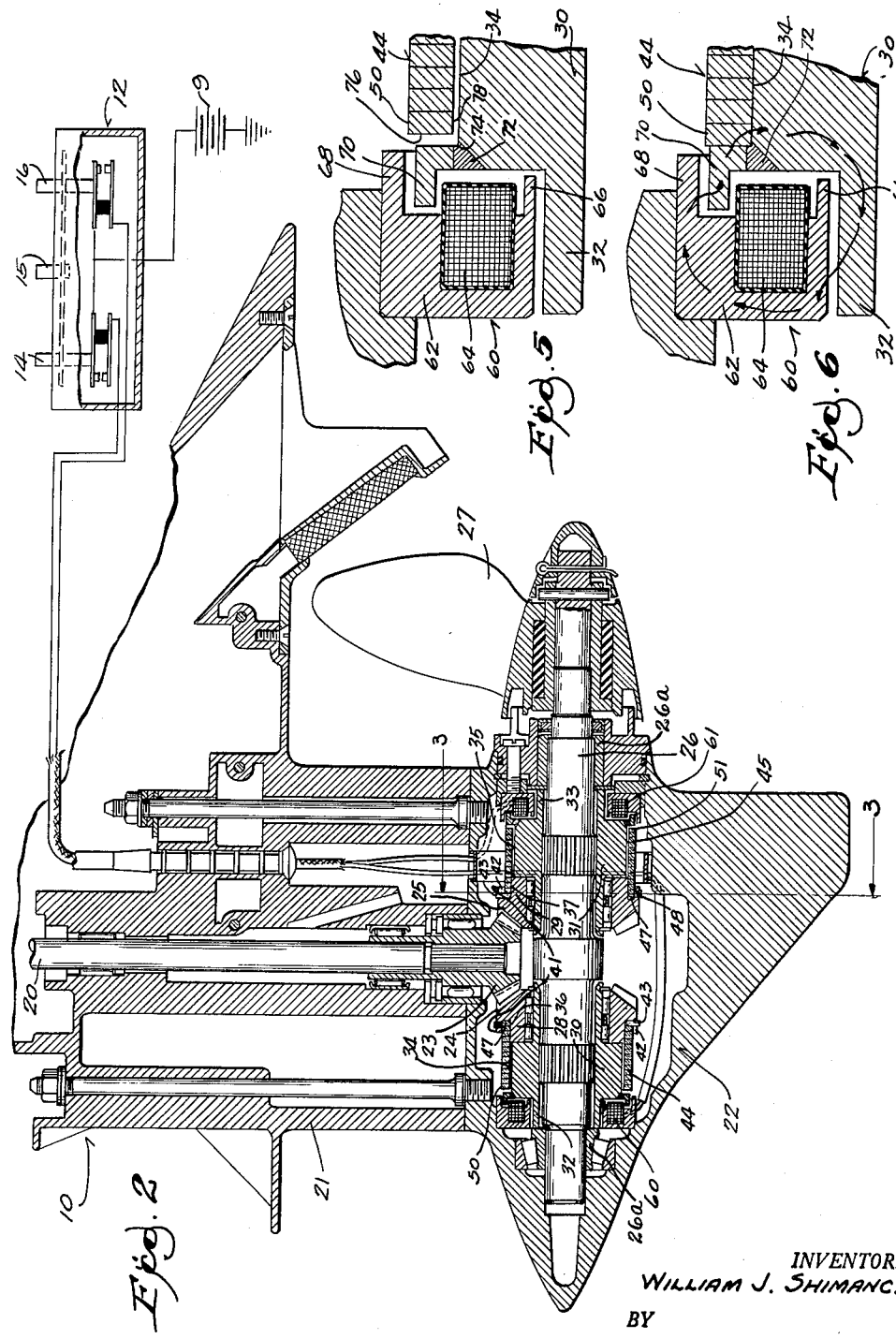

3,216,392
MARINE PROPULSION DEVICE WITH ELECTRO-
MAGNETIC REVERSING CLUTCH
William J. Shimanckas, Waukegan, Ill., assignor to Outboard Marine Corporation, Waukegan, Ill., a corporation of Delaware
Filed Oct. 9, 1961, Ser. No. 143,773
10 Claims. (Cl. 115—41)

This invention relates to a marine propulsion device with electromagnetic reversing clutch.

In the type of propulsion device to which this invention particularly relates, there is an upright drive shaft carrying a gear disposed in a normally submerged gear housing, where it meshes with two bevel driven gears which may be clutched selectively to the propeller shaft. To minimize the resistance of the water in the passage of this gear housing, the frontal area and cross section of the gear housing must be kept as small as possible. To this end, the specifically new clutches which couple the driven gears selectively to the propeller shaft are of a known type employing a clutch spring anchored to the respective gear and wound helically around the shaft or a sleeve splined to the shaft, the diameter of the assembly being no greater than that of the adjacent gear.

The clutch springs are normally free of substantial contact with the driven surface which they encircle. However, they can be caused to wind themselves tightly upon that surface for clutching action if rotation of the free end of the spring remote from the gear is retarded, the direction of the winding in relation to the direction of rotation being such that resistance to the rotation of the free end of the spring will cause it to wind on the surface of the part to be driven. Clutches using electromagnetic action as a means of effecting this result are known. However, it is a feature of the present invention that the electromagnetic attraction is exerted in such a way that the end coil of the spring is drawn radially inwardly as well as axially against surfaces with which it reacts frictionally, thus providing both terminal and inner peripheral frictional contact for the end coil when the energizing magnet acts.

Because a propulsion device of this kind has its lower unit dirigible for steering as well as tiltable respecting the boat upon which it is mounted, there are many problems in the provision of mechanical controls for reversing clutch mechanism in the submerged gear housing. The flexibility of electrical connections eliminates these problems and facilitates reversing control from any part of a boat equipped with a device embodying the invention.

In the drawings:

FIG. 1 is a view of a marine propulsion device embodying the invention as it appears when installed in a boat fragmentarily shown in longitudinal section.

FIG. 2 is a fragmentary detail view on an enlarged scale in fore and aft section through the lower unit of a propulsion device embodying the invention.

FIG. 3 is a view taken in transverse section on the line 3—3 of FIG. 2.

FIG. 4 is a fragmentary view taken in section on the line 4—4 of FIG. 3.

FIG. 5 is a fragmentary detail view similar to a portion of FIG. 2 but on a greatly enlarged scale.

FIG. 6 is a view similar to FIG. 5 showing the parts in the position they assume when the clutch is energized.

The boat hull 7 is equipped with steering wheel 8, battery 9, propulsion unit 10 and a remote fuel tank 11 therefor. Conveniently accessible to an operator using the steering wheel is a control case 12 having a throttle lever 13 which is operatively connected with the throttle of propulsion unit 10 (not shown) and is provided with push-button switches 14, 15 and 16 for forward, neutral and reverse, respectively. The push buttons are provided with interlocks of conventional type (not illustrated) so that any one of the push buttons will remain depressed to hold its related switch closed until released by the depression of another button.

Any appropriate source of power drives the upright shaft 20 of the propulsion unit 10 aft of the boat transom 17. The shaft 20 is located in a tiltable and dirigible hollow strut 21 which has gear housing 22 at its lower end. Within the gear housing, the drive shaft 20 carries a driving bevel gear 23 meshing with driven bevel gears 24 and 25 for forward and reverse operation of the propeller shaft 26. The propeller shaft is rotatably mounted in suitable bearings 26a and provided with appropriate seals. The shaft 26 projects aft of the gear housing 22 for the support of propeller 27.

The forward and reverse gears 24 and 25 are not mounted directly on the shaft but, except when clutched thereto, are free for rotation on the reduced terminal extensions or hub portions 28 and 29 of the respective clutch sleeves 30 and 31 which are splined to the shaft. The sleeves 30 and 31 have axially projecting extensions 32 and 33 of reduced radius, which are received within the clutch-energizing magnets hereinafter described.

The cylindrical clutch surfaces 34 and 35 of the respective clutch sleeves are proximate to hub surfaces 36 and 37 of slightly greater radius on the hub portions 28, 29 of the respective bevel gears 24 and 25. The gears 24 and 25 have respective flanges 41 respectively overhanging the cylindrical hub surfaces 36 and 37 and notched at 42 to receive the outturned fingers 43 at the end of the respective clutch spring 44 or 45 as best shown in FIG. 3. The fixed end coil 47 of the respective spring snugly embraces the hub 36 or 37 and a set screw 48 may conveniently be threaded through the overhanging flange 41 into engagement with the coil as exemplified in FIG. 3. This set screw prevents the coil from moving out of the notch in the flange of the respective gear. The hooked end 43 of the coil is thereby maintained in the notch 42. The engagement of the hooked end of the spring in the notch transmits the driving torque, whereby the set screw 48 has no function other than to hold the coil against axial displacement.

The clutch springs 44 and 45 have free end terminal coils 50, 51 which may be ground flat, if desired, to serve in lieu of separately prefabricated armatures for the annular magnets generically designated by reference characters 60 and 61 and specifically illustrated in FIGS. 5 and 6. Each magnet includes an annular soft iron shell 62 in which an annular winding 64 is encapsulated. The shell includes an inner annular pole 66 in close proximity to, but free of bearing contact with, the reduced extension 32 of the clutch sleeve 30.

The shell further includes an external fixed annular pole 68 which is spaced in close proximity but out of actual contact with a rotatable annular pole 70 which desirably laps the winding 64 slightly as shown in FIG. 5, being notched in its inner periphery for that purpose. The inner periphery of the rotatable pole 70 is connected by brazing 72 or other non-ferrous or relatively non-magnetic means to the clutch sleeve 30. This sleeve is desirably made of soft iron. The insert 72 which holds the rotatable pole annulus 70 to the clutch sleeve 30, and is relatively a poor conductor of magnetic flux, is desirably of triangular cross section and notched at 74 into what would otherwise be its apex adjacent the angle between the end face 76 and the inner periphery 78 of the end coil 50 of clutch spring 44. It will, of course, be understood that this structure is duplicated in the reverse clutch spring and magnet.

The inner peripheral radius of each clutch spring is such that the clutch spring is normally free of the complementary clutch sleeve, as clearly appears in FIG. 5. However, when current is passed through the winding 64 to energize the clutch, the resulting magnetic flux passes through the soft iron shell 62 of the magnet and through the stationary poles 66 and 68 and the rotating pole 70 and the clutch sleeve 30. The gap established by the flux-resistant fillet 72 causes the flux to pass outwardly through the terminal coil 50 of the clutch spring, thereby drawing the terminal coil not only axially but also radially inwardly into the angle 74 and into engagement with the end of the rotating polar annulus 70 and with the external periphery 34 of the clutch sleeve 30. Since the opposite end of the clutch spring is positively driven and the clutch spring is wound in such a direction that the retarding of its free end coil will cause it to contract, it follows that the frictional engagement of its terminal coil 50 with the then stationary rotatable pole element 70 and clutch-sleeve 30 will cause the spring to coil itself tightly upon the clutch sleeve, thereby transmitting forward rotation to the propeller shaft and propeller from the gear 24.

If the opposite magnet 61 had been energized, the clutch spring 45 would have coiled itself tightly on the clutch sleeve 31 to drive the propeller shaft 26 from bevel gear 25 for the reverse operation of the shaft and propeller.

I claim:

1. An electromagnetically operable clutch comprising driving and driven elements, said driven element having a ferro-magnetic cylindrical portion, a ferro-magnetic part extending radially outwardly from said cylindrical portion, and a flux-resistant portion connecting said cylindrical portion to said radially extending part, a wrap spring connected with the driving element and having a free end portion with at least a terminal coil of magnetizable material, said terminal coil being in encircling relation to a part of the cylindrical portion of said driven element, in adjacent relation to said radially extending part of said driven element, and normally free of pressure engagement with said driven element, means for establishing an electromagnetic flux path including said radially extending part, said encircled part of said cylindrical portion of said driven element, and said terminal coil, and means for establishing flux on said path, whereby, incident to the flow of flux on said path, said terminal coil is drawn radially inwardly toward said encircled part of said cylindrical portion and axially toward said radially extending part into sufficient frictional contact with said cylindrical portion and with said radially extending part to effect wrapping of said spring about said driven element in operative pressure engagement and driving connection therewith.

2. An electromagnetically operable clutch comprising a driving element, a driven element having a ferro-magnetic cylindrical portion, a stationary ferro-magnetic pole disposed radially outwardly from said cylindrical portion, a wrap spring connected with the driving element and having a free end portion of magnetizable material including at least one coil encircling a part of said cylindrical portion of said driven element adjacent to said pole and being normally free of pressure engagement with said driven element, means for establishing an electromagnetic flux path through said encircled part of said cylindrical portion of said driven element, said pole, and said one coil, said electromagnetic flux path establishing means including a flux-resistant material between said encircled part of said cylindrical portion and said pole, and means for establishing flux on said path, whereby, incident to the flow of flux on said path, said coil is drawn radially inwardly into sufficient frictional contact with said cylindrical portion to effect wrapping of said spring about said driven element in operative pressure engagement and driving connection therewith.

3. An electromagnetically operable clutch comprising relatively fixed and rotatable parts of ferro-magnetic material, said rotatable part having a cylindrical portion, a driving element, a wrap spring connected with said driving element and having a free end portion of magnetizable material including at least one coil in normally free encircling relation to a part of the cylindrical portion of said rotatable part and in adjacent relation to said fixed part, means for establishing an electromagnetic flux, means for establishing an electromagnetic flux path including said relatively fixed part, said encircled part of said cylindrical portion of said rotatable part, and said one coil, said flux path establishing means also including means for establishing a magnetic gap in said flux path between said relatively fixed and rotatable parts comprising a frusto-conical insert of non-magnetic material in one of said relatively fixed and rotatable parts, whereby, incident to the establishment of a magnetic flux in said path, said one coil is drawn radially inwardly toward said encircled part of said cylindrical portion into sufficient frictional contact with said cylindrical portion to effect wrapping of said spring about said rotatable element in operative pressure engagement and driving connection therewith.

4. An electromagnetically operable clutch comprising driving and driven elements, a wrap spring connected with the driving element and having a free end portion encircling a portion of the driven element and normally free of pressure engagement therewith, and means for establishing an electromagnetic flux path including the driven element and a coil of said spring whereby to draw said coil into frictional contact with the driven element sufficient to effect the wrap of said spring about the driven element in operative pressure engagement and driving connection thereto, said means for establishing a flux path including the driven element comprising a relatively fixed magnet including inner and outer annular poles and a winding for energizing said poles, the outer pole being of greater radius than the free end portion of the wrap spring, an annular polar extension of magnetic material projecting radially outwardly from adjacent to the surface of the driven element portion encircled by said spring to immediately adjacent said outer pole to receive flux from said outer pole, and means which is primarily within the radius of the surface of the driven element portion encircled by said spring and which is relatively nonconductive of magnetic flux for mechanically connecting said polar extension with the driven element for rotation therewith, said last mentioned means establishing a flux gap forcing flux to travel, between said polar extension and said driven element, through the free end portion of said wrap spring whereby to attract said free end portion axially toward said polar extension and radially inwardly toward the encircled portion of said driven element when the winding is energized.

5. An electromagnetically operable clutch comprising driving and driven elements, a wrap spring connected with the driving element and having a free end portion including a terminal coil encircling a portion of the driven element and normally free of pressure engagement therewith, and means for establishing an electromagnetic flux path including said driven element and said terminal coil of said spring whereby to draw said spring into frictional contact with the driven element sufficient to effect the wrap of said spring about the driven element in operative pressure engagement and driving connection thereto, said flux path establishing means comprising a magnet having a first pole proximate said driven element and in flux transferring relation thereto, and a second pole connected for rotation with said driven element, said second pole having a part extending radially outwardly from adjacent to said driven element portion encircled by said spring, and means providing resistance to flux flow between said driven element and said radially extending second pole part, said terminal coil being located at the angular convergence between said driven element and said second pole part, said means resisting flux flow between said second pole part and said driven element causing flux flow to be deflected through said terminal coil of said spring, whereby to radially attract said terminal coil to said encircled driven element portion as well as to axially attract said terminal coil of said spring to said radially extending second pole part.

6. A marine propulsion device including a generally upright strut mounted for vertical and horizontal dirigible movement and including a driveshaft, a propeller shaft mounted on said strut to partake of said strut movement and having bearings for its independent rotation, means including clutch means for rotatably driving said propeller shaft from said driveshaft, electromagnetic means for actuating said clutch means, and electrical connections to said electromagnetic means extending within said strut from the exterior of said marine propulsion device.

7. The combination in a marine propulsion device of an upright strut provided with a driveshaft, a normally submerged gear housing connected with said strut and provided with propeller shaft bearings, a propeller shaft carried by said bearings, a clutch connection from said driveshaft to said propeller shaft including a driven clutch element of circular cross section on said propeller shaft, and meshing gears respectively mounted on said shafts, said propeller shaft gear being rotatable with respect to said propeller shaft and having a hub substantially corresponding in radius with the driven clutch element on said propeller shaft and an annular flange spaced radially outwardly from said hub and provided with an axial notch, a wrap spring having a first coil normally free of said driven clutch element, having a second coil disposed between said hub and said flange on said propeller shaft gear, and being provided, at one end, with a finger extending outwardly through said notch, means connecting with said flange for retaining said second coil in position on said hub with said finger engaged in said notch, and means for electromagnetically attracting said spring into frictional engagement with said element whereby to bring about the wrap of said spring on said element and the driving thereof from said propeller shaft gear.

8. A marine propulsion device including a generally upright strut mounted for vertical tilting and horizontal dirigible movement and including a driveshaft, a propeller shaft mounted on said strut to partake of said strut movement and having bearings for its individual rotation, clutch means including a pair of separate clutches for separately connecting said propeller shaft to said driveshaft to provide selective rotation of said propeller shaft in each rotative direction, each of said clutches including electromagnetic means for actuating said clutches, each of said electromagnetic means including a coil disposed around the axis of said propeller shaft.

9. A marine propulsion device including a generally upright strut mounted for vertical tilting and horizontal dirigible movement, said strut including therein first bearing means, a driveshaft carried by said first bearing means and having a driving gear thereon, second bearing means, a propeller shaft carried by said second bearing means and having a pair of portions of magnetizable material, a pair of driven gears enmeshed with said driving gear, said driven gears being concentric with said propeller shaft and being rotatable relative thereto, separate clutches for connecting each of said driven gears to said propeller shaft, each of said clutches including one of said pair of propeller shaft portions, one of said driven gears, a wrap spring connected to the respective one of said driven gears and encircling the respective one of said propeller shaft portions, said wrap spring having a portion of magnetizable material, and means including an electrical winding for establishing electromagnetic flux in a path including said wrap spring portion and the respective one of said propeller shaft portions, and electrical connections from said windings through said strut to the exterior thereof.

10. A marine propulsion device including a generally upright strut mounted for vertical tilting and horizontal dirigible movement, said strut including therein first bearing means, a driveshaft carried by said first bearing means and having a driving gear thereon, second bearing means, a propeller shaft carried by said second bearing means and having thereon a pair of portions of magnetizable material, a pair of driven gears enmeshed with said driving gear, said driven gears being concentric with said propeller shaft and being rotatable relative thereto, separate clutches for connecting each of said driven gears to said propeller shaft, each of said clutches including one of said pair of propeller shaft portions, one of said driven gears, a wrap spring connected to the respective one of said driven gears and encircling the respective one of said propeller shaft portions, said wrap spring having a portion of magnetizeable material, and means including a fixed electrical winding disposed around the axis of said propeller shaft for establishing electromagnetic flux in a path including said wrap spring portion and the respective one of said propeller shaft portions, and electrical connections from said windings through said strut to the exterior thereof.

References Cited by the Examiner
UNITED STATES PATENTS

| | | | |
|---|---|---|---|
| 1,182,589 | 5/16 | Schnuck. | |
| 2,235,266 | 3/41 | Starkey | 192—51 |
| 2,728,320 | 12/55 | Kloss | 192—51 X |
| 2,756,855 | 7/56 | Kloss | 192—51 X |
| 2,798,581 | 7/57 | Supitilov. | |
| 2,857,998 | 10/58 | Harter. | |
| 2,970,681 | 2/61 | Timmcke. | |
| 2,975,648 | 3/61 | Doerries | 192—51 X |
| 3,040,856 | 6/62 | Shoquist. | |
| 3,149,705 | 9/64 | Shoquist | 192—35 |
| 3,149,706 | 9/64 | Mason et al. | 192—35 |

FOREIGN PATENTS 507,207  9/20  France.

DAVID J. WILLIAMOWSKY, *Primary Examiner.*

THOMAS J. HICKEY, *Examiner.*